United States Patent
Leikucs et al.

(10) Patent No.: US 7,698,264 B2
(45) Date of Patent: Apr. 13, 2010

(54) SYSTEM AND METHOD FOR SPARSITY REMOVAL

(75) Inventors: Andrew Leikucs, Ottawa (CA); Stewart Winter, Metcalfe (CA)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/803,338

(22) Filed: May 14, 2007

(65) Prior Publication Data

US 2008/0288525 A1 Nov. 20, 2008

(51) Int. Cl.
*G06F 17/30* (2006.01)
*G06F 17/00* (2006.01)

(52) U.S. Cl. .......................................... 707/3; 707/101
(58) Field of Classification Search ........................ None
See application file for complete search history.

(56) References Cited

U.S. PATENT DOCUMENTS 6,775,661 B1 8/2004 Redner
2006/0074901 A1 4/2006 Pirahesh et al.

OTHER PUBLICATIONS

Tico et al, "An Efficient Sparse Data Filtering Method for Image Histogram Comparison", Proceedings of the Scandinavian conference on image analysis 1999, reaearch.nokia.com, 8 pages.*
Ji et al, "Online Recommendation Based on Customer Shopping Model in E-Commerce", Proceedings of the IEEE/WIC International Conference on Web Intelligence, IEEE 2003, 7 pages.*
European Search Report from corresponding European Patent Application No. 08153991.8-1527 dated May 25, 2009 (6 pages).
Ying Wang et al., "Efficient Filtering Query Indexing in Data Stream," Web Information Systems—Wise 2006 Workshops Lecture Notes in Computer Science; Lncs, Springer, Berlin, DE, vol. 4256, Jan. 1, 2006 pp. 1-12.

* cited by examiner

*Primary Examiner*—Uyen T. Le
(74) *Attorney, Agent, or Firm*—Shumaker & Sieffert, P.A.

(57) ABSTRACT

Method and system for removing sparse data in a response to a query to a multidimensional database by establishing a cross-tab with sparse data. After selecting a member in an axis of the cross-tab for sparsity removal, a first set expression on the orthogonal axis is selected in the context of the member. The context of the orthogonal axis is collected for generating a filter set expression with a data removal criteria, based on the collected context; and the query is submitted to the database with the filter set expression.

11 Claims, 14 Drawing Sheets

(c)

| Revenue | | 2002 | 2003 |
|---|---|---|---|
| Product 2 | Ottawa | 300 | 23 |
| | Included | 300 | 262 |
| | Ontario | 800 | 280 |

(d)

| Revenue | | 2002 | 2003 |
|---|---|---|---|
| Product 1 | Ottawa | | 23 |
| | Included | | 23 |
| | Ontario | 500 | 25 |
| Product 2 | Ottawa | 300 | 23 |
| | Hamilton | | 62 |
| | Included | 300 | 262 |
| | Ontario | 800 | 280 |

| Revenue | | 2004 | 2005 | 2006 | Years |
|---|---|---|---|---|---|
| Camping Equipment | United States | $5,013,274.60 | $4,817,763.74 | $5,898,662.42 | $15,729,700.76 |
| | Canada | $3,633,143.56 | $5,025,854.00 | $6,807,967.52 | $15,466,965.08 |
| | Subtotal (included) | $8,646,418.16 | $9,843,617.74 | $12,706,629.94 | $31,196,665.86 |
| | Americas | $10,437,996.60 | $11,776,754.58 | $15,037,083.06 | $37,251,834.16 |
| Golf Equipment | United States | $872,564.90 | $1,182,616.20 | $1,407,723.18 | $3,462,908.28 |
| | Canada | $778,474.52 | $809,234.46 | $1,052,655.39 | $2,640,364.30 |
| | Subtotal (included) | $1,651,079.42 | $1,991,844.66 | $2,460,388.36 | $6,103,272.58 |
| | Americas | $1,978,245.94 | $2,429,298.30 | $2,815,742.12 | $7,223,286.36 |
| Outdoor Protection | United States | $228,309.36 | $104,312.74 | $71,800.86 | $404,422.96 |
| | Canada | $112,047.76 | $69,619.24 | $52,682.24 | $234,349.24 |
| | Subtotal (included) | $340,357.12 | $173,931.98 | $124,483.10 | $638,772.20 |
| | Americas | $492,498.26 | $261,716.62 | $184,973.22 | $939,188.10 |
| Personal Accessories | United States | $1,098,199.36 | $1,477,380.78 | $1,757,005.16 | $4,332,585.24 |
| | Canada | $921,665.00 | $889,158.04 | $1,083,404.42 | $2,894,227.46 |
| | Subtotal (included) | $2,019,864.38 | $2,366,518.74 | $2,840,439.58 | $7,226,822.70 |
| | Americas | $2,384,156.96 | $2,887,110.38 | $3,544,178.56 | $8,815,445.90 |
| Products | United States | $7,212,348.26 | $8,663,477.72 | $10,476,678.48 | $26,352,504.46 |
| | Canada | $5,445,350.84 | $7,698,487.38 | $10,239,881.32 | $23,383,719.54 |
| | Subtotal (included) | $12,657,699.10 | $16,361,965.10 | $20,716,559.80 | $49,736,224.00 |
| | Americas | $15,412,898.76 | $18,473,578.38 | $24,338,295.84 | $59,216,772.98 |

SYSTEM AND METHOD FOR SPARSITY REMOVAL

FIELD OF THE INVENTION

The present invention relates to business intelligence data queries, more specifically, the present invention relates to system and method for optimizing business intelligence data queries within a client-server architecture.

BACKGROUND OF THE INVENTION

Business decision makers often use business intelligence analytical software to pose operational performance questions as queries against their data sources. The basic capabilities of querying and reporting functions is extended by On-line Analytical Processing (OLAP), allowing a robust multidimensional understanding of the data from a variety of perspectives and hierarchies in a multidimensional database. OLAP operations such as drill-down, roll-up and pivot provide insights into business growth, spending, and sales patterns that would simply not be possible otherwise. Other OLAP functionality includes operations for ranking, moving averages, growth rates, statistical analysis, and "what if" scenarios.

Multidimensional databases intuitively view data as a multidimensional structural metaphor called a cube whose cells correspond to events that occurred in the business domain. Each event is quantified by a set of measures; each edge of the cube corresponds to a relevant dimension for analysis, typically associated to a hierarchy of attributes that further describe it. A multidimensional database may further comprise a collection of related cubes. Dimensions, such as an essential and distinguishing concept in multidimensional databases, are used for selecting and aggregating data at the desired level of detail.

However, the data to be analyzed often have up to 20 or more dimensions, making computations complex and costly. As the dimensions increase, and the number of members of each dimension increases, the number of cells increases dramatically. The number of cells in many cubes representing a business process in a medium or large company is often too large to provide a fast and efficient calculation.

Many of the cells in a cube are interconnected by formulas. Cells representing profit, for example, are calculated by the difference between corresponding cells representing revenue and corresponding cells representing expenses. Cells representing a year are computed as the sum of corresponding cells representing months which in turn are computed as the sum of corresponding cells representing days.

Often there is null or zero data interspersed throughout important data, resulting in sparsity of relevant data in the database. For example, no sale was made on a given day of a given product by a given salesperson to a given customer by a given sales channel. The business intelligence analysis activity typically involves the creation and manipulation of a cross-tabulation, or cross-tab. The sparsity of data makes it difficult to derive useful information when presenting data in a cross-tab, due to the relationship-based nature of multidimensional querying, analysis and reporting.

The sparsity of data may also be a result of a user creating a new cross-tab. Many common user scenarios may lead to cross-tabs with empty result sets. Removing sparse data from cross-tab views is therefore an important way to improve the readability of the user's data.

The business intelligence analytical tool is often implemented in a server-client architecture. The analytical tool often includes a client that provides a user interface, for example, a client browser; and a server that handles processing of queries and retrieval of data from data sources. Therefore, both accessing the desired cells with sparsity in the vast array of data in a database, and returned result data with sparsity can add significantly to the time taken to process a query.

There have been different approaches to remove the sparsity in the data. One is a brute-force zero-suppression by removing all cells with null or zero value in query result individually. This approach, while easy to execute, does not provide any selectivity when the null or zero data are removed, thereby suffering from poor performance for any significantly sized multi-dimensional data source.

Another approach is based on filtering member sets based on data value criteria. This approach may be tedious and error-prone as it requires in-depth knowledge of the data and intensive user-interaction to define appropriate filters, resulting in poor usability.

Yet another approach is described in U.S. Pat. 6,728,697 to Leathers, which is hereby incorporated by reference in its entirety. U.S. Pat. 6,728,697 teaches a mechanism to partition the processing work in such a way that the processing can be carried out by the OLAP data source, thereby improving the efficiency of the delegated portion of the operations, and making more effective use of the overall processing power of the computing facilities. Rows and columns of the original cross-tabulation (cross-tab) formed from the data are classified as either simple, or complex, depending whether the data can be computed at the OLAP data source. Accordingly, zero suppression may be carried out through an a priori preliminary determination of which rows and columns contain only zero, null or other non-relevant values, before the data is requested. A Boolean may be used to indicate whether a row has any zero or null data, and to condition subsequent operations.

There is therefore a need to query a multidimensional database in a single step, using sparse data removal criteria to determine whether certain data is returned in the query result, thereby enhancing the view of relevant data, and making the decision-making process more effective and timely.

It is further desirable to provide a mechanism for providing business intelligence information from the server to the client more efficiently, more specifically, there is a need to provide an efficient result set from a server to a client when responding to a query from the client.

SUMMARY OF THE INVENTION

It is an object of the invention to provide an improved system and method for optimizing business intelligence data delivery in a client-server architecture.

The invention according to an aspect of the invention provides a method for removing sparse data in a response to a query to a multidimensional database, the method comprising the steps of: establishing a cross-tab with sparse data, the cross-tab comprising a first dimensional axis and a second dimensional axis, the second dimensional axis being orthogonal to the first dimensional axis; selecting a member in the first dimensional axis for sparsity removal in the second dimensional axis; selecting a first set expression on the second dimensional axis in a first context of the selected member; collecting a second context of the second dimensional axis; generating a filter set expression based on the collected second context; the filter set expression including a data removal criteria; and submitting a query with the filter set expression.

Preferably, the second dimensional axis is a cross-join axis comprising an inner set expression, and the method further comprises the steps of: initializing a tuple with the first set expression; collecting a third context from the inner set expression; updating the tuple to reflect the second context and the third context; and generating the filter set expression based on the tuple.

Preferably, the data removal criteria are to remove irrelevant data.

Preferably, the data removal criteria are to remove null data.

Preferably, the data removal criteria are to remove zero data.

In accordance with another aspect of the present invention there is provided a business intelligence analysis system comprising a client and a server, the server responding to a query to a multidimensional database from the client, the system comprising: means for establishing a cross-tab with sparse data, the cross-tab comprising a first dimensional axis and a second dimensional axis, the second dimensional axis being orthogonal to the first dimensional axis; the client comprising: means for selecting a member in the first dimensional axis for sparsity removal in the second dimensional axis; the server comprising: means for selecting a first set expression on the second dimensional axis in a first context of the selected member; means for collecting a second context of the second dimensional axis; means for generating a filter set expression based on the collected second context, the filter set expression including a data removal criteria; and means for submitting a query with filter set expression.

Preferably, the second dimensional axis is a cross-join axis comprising an inner set expression, and the server further comprising: means for initializing a tuple with the first set expression; means for collecting a third context from the inner set expression; means for updating the tuple to reflect the second context and the third context; and means for generating the filter set expression based on the tuple.

Preferably, the data removal criteria are to remove a member selected from a group consisting of irrelevant data, null data, zero data and a combination thereof.

The invention according to another aspect provides a storage medium readable by a computer encoding a computer program for execution by the computer to carry out a method for processing a request from a client to a business intelligence analysis server, the computer program comprising: code means for establishing a cross-tab with sparse data, the cross-tab comprising a first dimensional axis and a second dimensional axis, the second dimensional axis being orthogonal to the first dimensional axis; code means for selecting a member in the first dimensional axis for sparsity removal in the second dimensional axis; code means for selecting a first set expression on the second dimensional axis in a first context of the selected member; code means for collecting a second context of the second dimensional axis; code means for generating a filter set expression based on the collected second context; the filter set expression including a data removal criteria; and code means for submitting a query with the filter set expression.

Preferably, the second dimensional axis is a cross-join axis comprising an inner set expression, and the computer program further comprises: code means for initializing a tuple with the first set expression; code means for collecting a third context from the inner set expression; code means for updating the tuple to reflect the second context and the third context; and code means for generating the filter set expression based on the tuple.

Preferably, the data removal criteria are to remove irrelevant data.

Preferably, the data removal criteria are to remove null data.

Preferably, the data removal criteria are to remove zero data.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 6 (b) depicts the steps of updating a tuple;

FIG. 6 (c) illustrates the retrieval steps of a sparsity removal in accordance with one invention;

FIGS. 6 (d) and (e) illustrate the result of sparsity removal of FIG. 6 (a);

FIG. 8 shows a cross-tab with an exemplary cross-joined axis;

FIG. 9 shows a cross-tab having an exemplary cross-joined axis with an aggregate calculation of the visible members;

FIG. 10 (b) shows the cross-tab of FIG. 10(a) after sparsity removal in accordance with one embodiment of the present invention;

FIGS. 13 (a) and (b) show same column member selected for different row axes.

DETAILED DESCRIPTION OF PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

Figure 1:
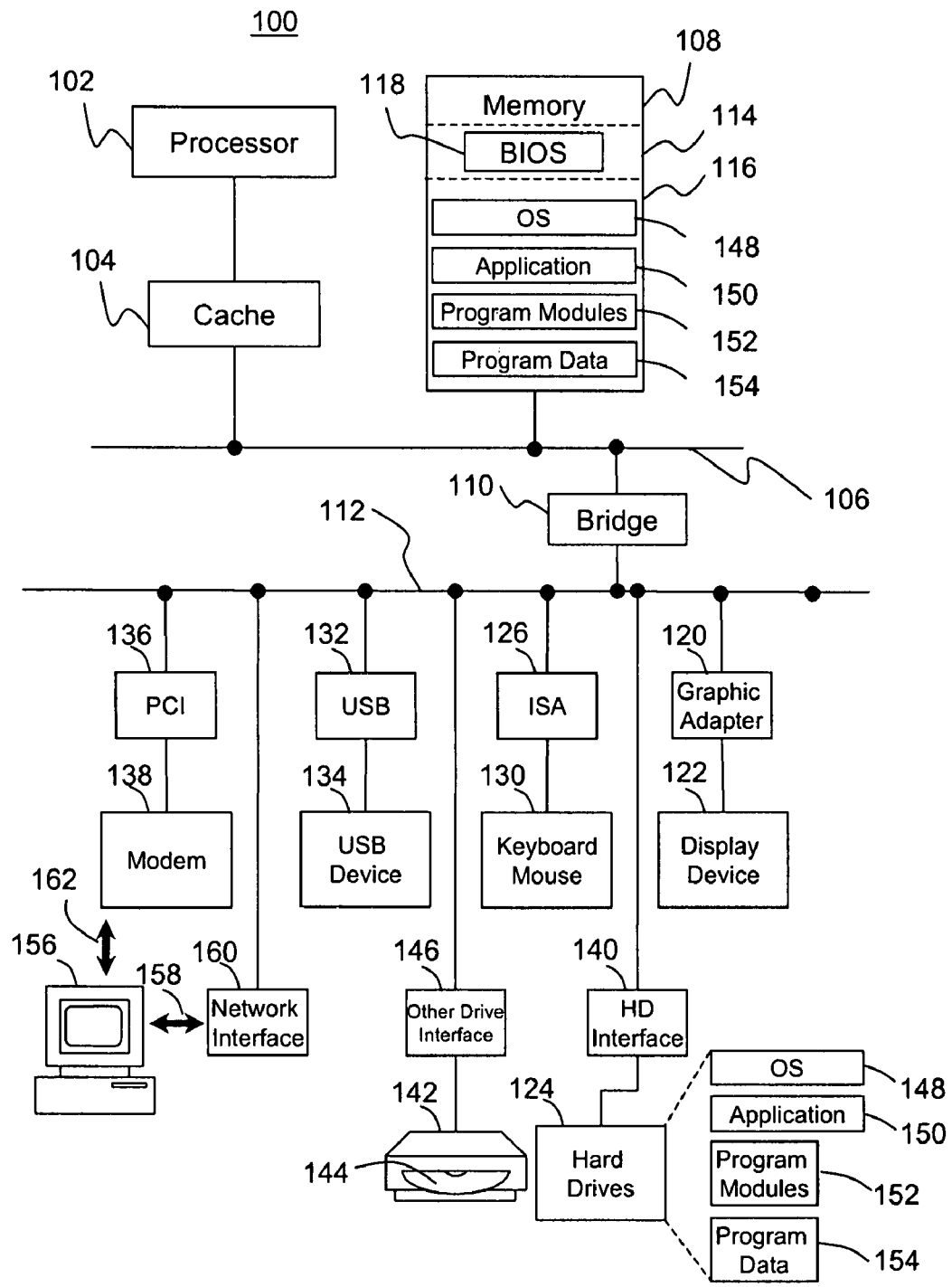
FIG. 1 shows a generic computing environment in which the present invention may be implemented.

FIG. 1 and the following discussion are intended to provide a brief general description. FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1, an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a keyboard 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
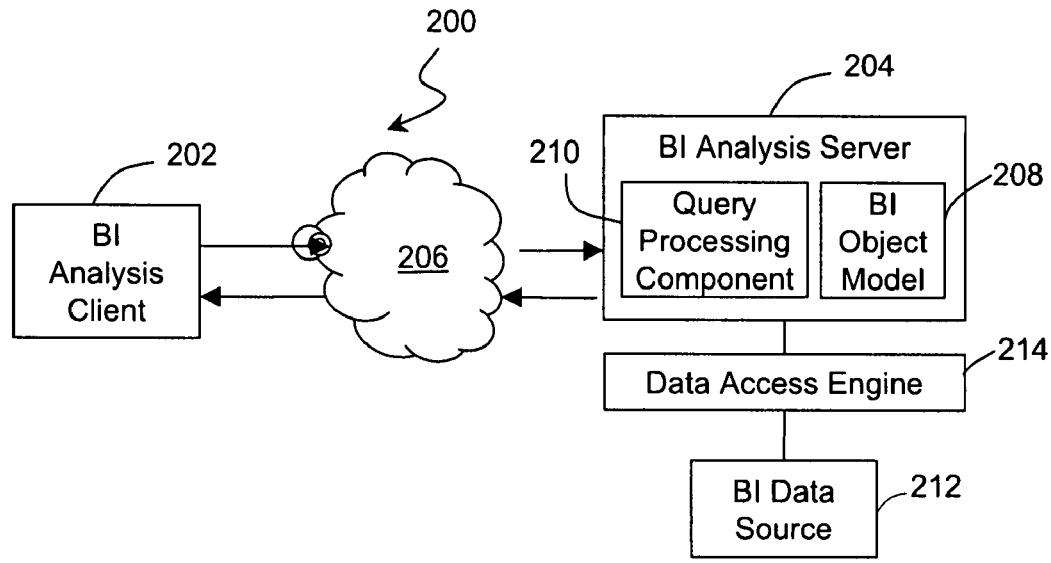
FIG. 2 is a block diagram showing a client-server architecture which performs business intelligence analysis.

FIG. 2 provides an overview of a business intelligence analysis client system 200 in accordance with an embodiment of the invention.

The business intelligence analysis client 202 communicates with a business intelligence analysis server 204 over a computer network 206, such as the Internet, an intranet and/or an extranet. The analysis server 204 has a business intelligence object model 208 and a query processing component 210. The object model 208 represents one or more underlying business intelligence data sources 212 storing business intelligence data. The query processing component 210 processes queries received from the analysis client 202 and retrieves requested data from the data sources 212 through the data access engine 214, using the object model 208.

Figure 3:
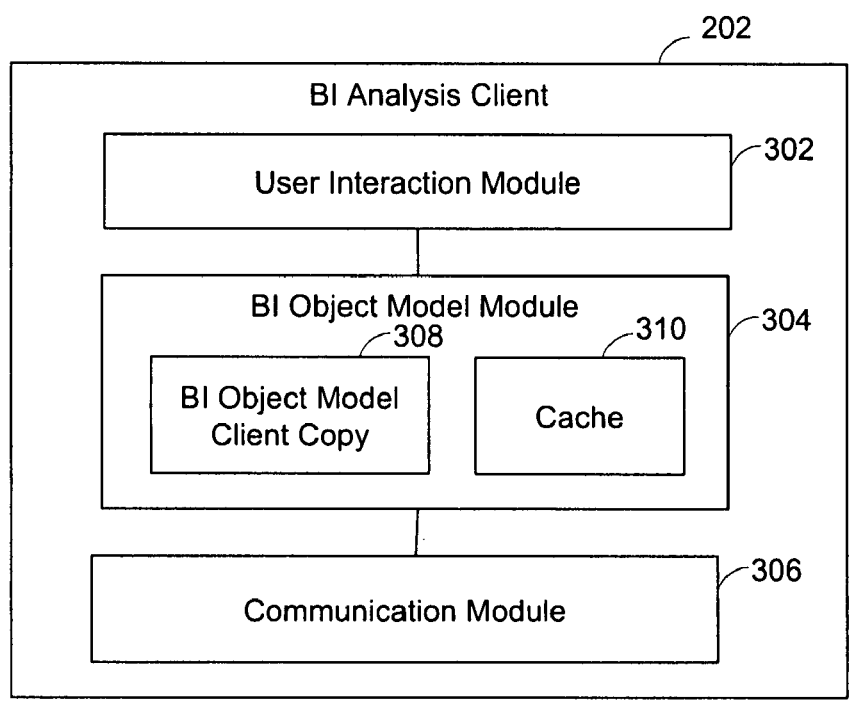
FIG. 3 is a block diagram showing an embodiment of a business intelligence analysis client.

As shown in FIG. 3, the analysis client system 202 has a user interaction module 302, a business intelligence object model module 304 and a communication module 306.

The user interaction module 302 manages user gestures through user interfaces, and converts the user gestures to requests comprising discreet commands for the object model module 304. For example, user gestures may include selecting, expanding or nesting data in a cross-tab. The user interaction module 302 also manages the rendering of the business intelligence objects for displaying responses to the user gestures.

The user interaction module 302 typically displays only a portion of the data available within the object model module 308, and may maintain a small copy of this data decorated to support efficient user interface activity.

The object model module 304 has a client copy 308 of the object model 208 of the analysis server 204. The object model client copy 308 stores model objects, which share a common definition with the analysis server 204. The analysis server 204 issues to the analysis client 202 commands to create, delete, replace or update objects in the object model client copy 308. For example, the analysis client 202 requests high level actions of the analysis server 204, such as drilling, expanding or nesting of data, and the analysis server 204 responds with object definitions and commands to modify the objects in the object model client copy 308. Thus, the analysis client 202 and analysis server 204 share a common business intelligence object model. When a member in an axis is specified for sparsity removal in accordance with the embodiments of the present invention, the selection may be stored in the client copy of the model.

The object model module 304 may also manage a cache 310 of objects. It may perform intelligent look-ahead behavior.

The communications module 306 manages requests issued to, and responses received from the analysis server 204. The communications module 306 parses responses and directs them to the appropriate objects in the object model client copy 308.

Figure 4:
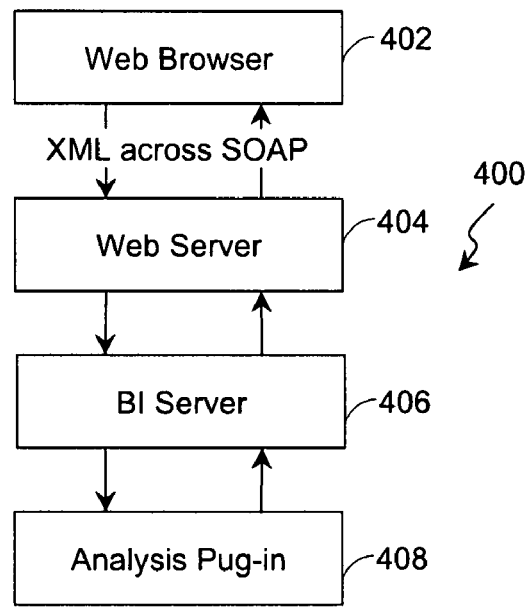
FIG. 4 is a block diagram showing an exemplary business intelligence analysis client-server system.
Figure 5:
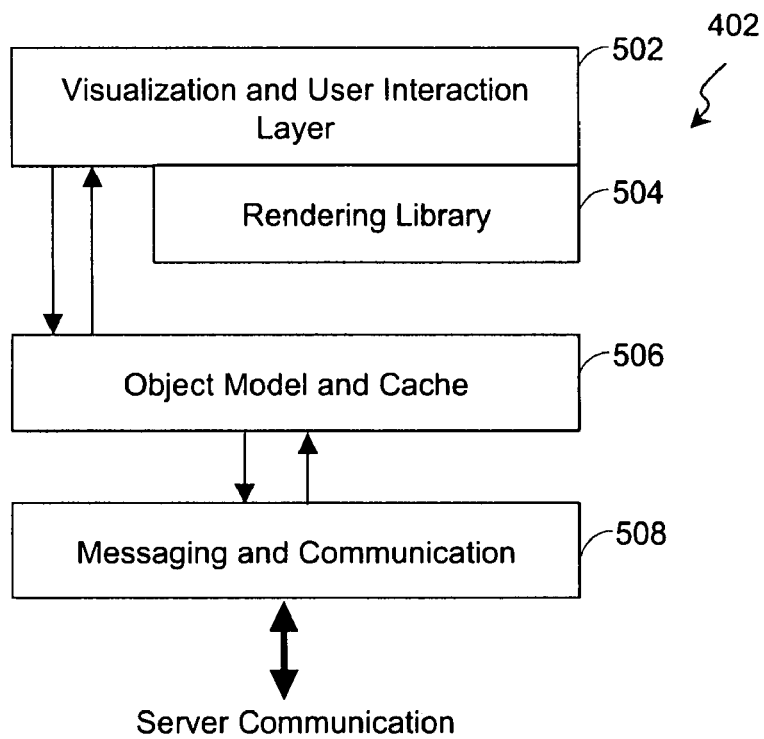
FIG. 5 is a block diagram showing the architecture of the Web browser based client in FIG. 4.

Referring to FIGS. 4 and 5, an exemplary business intelligence analysis client-server system 400 using a Web browser 402 is described. In this embodiment, the analysis client 402 is Web browser based. The Web browser based client 402 communicates to a Web server 404, which communicates with a business intelligence server 406 over a computer network, such as the Internet, an intranet and/or extranet. The business intelligence server 406 has an analysis plug-in 408 for updating the server copy of the business intelligence object model, processing queries, retrieving data and preparing commands to update the client copy of the common business intelligence object model.

FIG. 5 shows the architecture of the Web browser based client 402. The browser client 402 has a visualization and user interaction module or layer 502, an object model and cache module or layer 506 and a messaging and communication module or layer 508. These layers may provide similar functions as the user interaction module 302, business intelligence object model module 304 and communication module 306 shown in FIG. 3, respectively.

The visualization layer 502 has a rendering library 504 containing rendering elements, such as, menus, toolboxes, and cross-tabulation (cross-tabs).

The browser based client 402 may be written in javascript. The client-server interactions may use Extensible Markup Language (XML). The visualization of objects in the client may use Dynamic HTML (DHTML). The object model and cache layer 506 stores and manages the classes of objects, such as DataMatrix, MetadataSet, and FilterSet, which share a common definition with the business intelligence server 406.

The communications layer 508 manages Simple Object Access Protocol (SOAP) requests issued to and received from the business intelligence server analysis plug-in 408 via the Web server 404.

An example of the process flow between the components of the Web browser based client 402 and the business intelligence server 406 and analysis plug-in 408 is now described.

The visualization and user interaction layer 502 of the browser client 402 captures the user gestures. These gestures are converted to function calls into the object model layer 506.

The object model layer 506 then takes the function call and converts this to a business intelligence request to the web server 404. This request is formulated as an XML document and handed to the communication layer 508.

The communication layer 508 takes the XML document, wraps this into a SOAP request package, and then issues an HyperText Transfer Protocol (HTTP) request to the Web server 404 with this SOAP package. The communication layer 508 asynchronously monitors the progress of the request.

The Web server 404 sends the HTTP request to the business intelligence server 406 through the computer network.

The business intelligence server 406 receives the request and hands it to the analysis plug-in 408. The analysis plug-in 408 processes the request, queries the database as required, and creates an XML document containing the response. The XML document result describes updates to the common object model that is shared between the browser client 402 and the business intelligence server 406.

The communication layer 508 of the browser client 402 receives the HTTP response containing the SOAP response which includes the XML document describing the updates to the model in the object model layer 506. The communication layer 508 hands the XML document to the object model layer 506.

The object model layer 506 processes the XML response and updates the client or local copy of the model in the object model layer 506 with the changes identified by the business intelligence server analysis plug-in 408. The object model layer 506 notifies the visualization layer 502 about the changes to the objects of the model in the object model layer 506. The visualization layer 502 then completes the request pending state, and retrieves the new information from the object layer 506 and then updates the display, e.g., a tree and cross-tab, with the new information retrieved from the server as stored in the object layer 506 of the browser client 402.

The browser client 402 and the business intelligence server 406 are based on a client-server application program interface (API). The client-server API reflects well-defined separation of responsibilities between the browser client 402 and the business intelligence server 406. The API comprises a set of XML requests from the browser client 402 to the business intelligence server 406. In addition, there is a set of responses returned from the business intelligence server 406 to the browser client 402.

When a query is sent to the data source 212, for example, a multidimensional database, many of the cells may be related by formulas, and may have irrelevant data with regard to the relationship defined by the formulas, the cells may have simply null or zero data. The sparsity of data, i.e. cells with irrelevant, null or zero data dispersed throughout cells with useful data makes it difficult to derive useful information when presenting data in a cross-tab.

Many common user scenarios may also lead to cross-tabs with empty result sets. Preventing sparse data from being included in the query results returned from the server therefore improves the efficiency of the queries and the readability of the query results.

The term "fact" is intended to describe a focus of interest for the decision-making process; fact typically models a set of events occurring in the enterprise world. The term "measure" is intended to describe a numerical property of a fact, and therefore the quantitative aspects of interests for analysis. A fact may also have no measures, resulting in a null value. A dimension is intended to describe a fact property with a finite domain and one of its analysis coordinates. The set of dimensions of a fact determines its finest representation granularity and is generally represented through a tuple. A tuple therefore conceptually describes the location of a cell in a multidimensional cube. The tuple of the values, one for each dimension, describes an occurrence of a fact in a multidimensional database. The term "dimension attribute" intended to describe a property, with a finite domain, of a dimension. The term "hierarchy" is intended to describe a directed tree, rooted in a dimension, whose nodes are all the dimension tributes that describe that dimension, and whose arcs model many-to-one associations between pairs of dimension attributes.

The term "irrelevant data" is intended to include data that is null, zero or otherwise irrelevant to a query to a multidimensional, or dimensionally-modeled relational databases. Although the examples given in this description may use zero or null data, a person skilled in the art will readily appreciate that the examples can also be applied to data which is irrelevant to a query. The term "relevant data" is intended to include data that is needed to respond to the query. The term "sparse data" is intended to describe relevant data interspersed with irrelevant data in a multidimensional, or dimensionally-modeled relational databases. The term "sparsity" therefore is intended to describe the extent or degree of the relevant data dispersed with irrelevant data. The term "orthogonal axis" is intended to describe an axis, intersecting with the other axis in a cross-tab. The term "orthogonal dimension" is intended to describe a dimension, intersecting with the other dimension in a multidimensional database. The term "set expression" is intended to describe a collection of members from the same dimensional hierarchy, either explicitly specified, or generated by a multidimensional relationship function. A "cross-join" between a first set of members and a second set of members is a Cartesian product of the two sets, each member of the second set is enumerated for each member of the first set. The term "filter expression" is intended to describe a set expression that specifies criteria such that only members from the set expression that pass the criteria are returned from an associated query.

Figure 6:
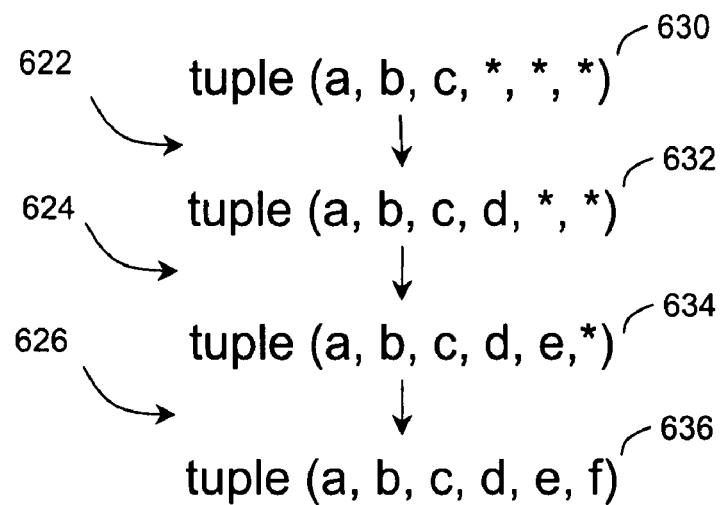
FIG. 6 (a) illustrates a multidimensional cross-tab.
Figure 6:
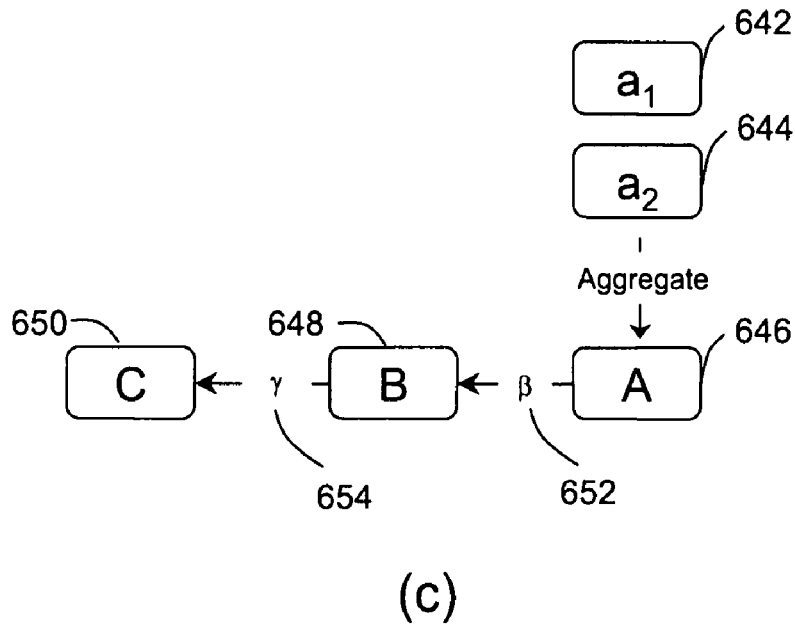

FIG. 6 (a) illustrates a multidimensional cross-tab 600 having a time dimensional axis 602 and a cross-joined axis 604 which is orthogonal to the time dimensional axis 602. Axis 602 may also be designated as column axis, while axis 604 is designated as row axis. In FIG. 6 (a), the cross-joined row axis 604 is the Cartesian product of the set 605 having the members of Product 1 606 and Product 2 608; and the set 609 having location members of children of Ontario, selected after a certain criteria, for example, the two children of Ontario with the highest count 610 612; an inclusion criteria 614 616 and Ontario 618 620. The exemplary cross-join row axis may be expressed as follows:

{Set (Product 1, Product 2)}33 {Set (topcount (2), included, Ontario)}

In the above example, Set (Product 1, Product 2) forms the outer set expression, and the Set (topcount (2), included, Ontario) forms the inner set expression.

A tuple 622 in the exemplary multidimensional database may be expressed as (Product 1, Ottawa, 2003).

In accordance with one embodiment of the present invention, a specific member or set of members along an axis 602 may be selected for removing sparsity in the members along the orthogonal axis 604. The criteria used to prevent rows or columns with irrelevant data from being returned in a response to a query along the orthogonal axis may be, but not limited to, that the members along the orthogonal axis have data values for every member along the selected axis that have solely null, zero or other irrelevant values.

The list of selected members is translated into a filter that is applied to the set of members for sparsity removal, i.e. the members along the orthogonal axis. Each selected member may contribute to the filter definition by defining one portion of the filter, and then logically 'OR'ing the portions together.

Referring to FIG. 6 (a), if the time dimensional axis 602 is selected for suppressing null data in the cross-join row axis 604, and the sparsity removal is applied to the column "2002", the filter for the outer set may be expressed as:

filter(children [Products], (tuple([2002],[Ontario],[Revenue]) is not null)

The filter for the inner set may be expressed as:

filter(children [Ontario], (tuple([2002],[Revenue]) is not null)

Here, the criteria for sparsity removal are specified by a column, for example [2002]. Items are only filtered out if null or zero values appear in cell values of the column.

A tuple may comprise many elements for specifying a location in the multidimensional database, with each element specifying one dimension and each dimension only represented once in the tuple. As shown in FIG. 6(b), a tuple (a, b, c, d, e, f) 636 may be formed through several steps 622 624 626, whereby the tuple is defined successively, and the tuple in a later step is based on the contexts and results from the previous steps. In this example, the tuple 636 has six elements, a, b, c, d, e, f; the tuples 630 632 and 634 may be considered as a partial tuple, with a number of elements in the tuple undefined. Each element in the tuple represents one dimension, therefore, partial tuple 630 has three elements a, b, c, and represents a context for the selected members a, b, and c. As the elements of the tuple are added successively to the partial tuple, the context for the selected set expression is implemented successively in the tuple. A tuple has a measure, either by default or included in the explicit list of members in the tuple. The measure for the above example is "Revenue".

After filtering the cross-joined inner set expression in FIG. 6 (a) in context of the outer member, the measure values for the intersections of 2002, Product 1, Ottawa; as well as 2002, Product 1, Toronto are null. The associated rows for these intersections will not be retrieved through the query. Furthermore, the row for the intersection of Product 2 and Hamilton is also not retrieved through the query due to the cell value being null for the intersection of 2002, Product 2, and Hamilton.

The resultant query results are shown in FIG. 6 (d). The results in FIG. 6 (d) also illustrate that the sparsity removal is an "outside-in" approach.

Referring to FIG. 6 (a), one of the members of the inner set expression of the row axis is named "Included". This member is an aggregation calculation that represents, in this example, a summarization of all the visible members of a sub-group of the inner set expression. The visible members of the sub-group are deemed to be of interest to the user. The overall summary represent the aggregation of all the members of each segment of the inner set expression. Since the "Included" aggregation is the summarization of the members of interest, then an evaluation is executed through the filter expression of the outer level set. This evaluation can be characterized as follows; if there are no relevant cell values for the inner set members of interest returned from the query, then the outer member is not returned either. In FIG. 6 (a), the members of interest are summarized using the "Included" member. In other cases, all members may be visible, in which case, the overall summary will be used for this evaluation.

Referring to FIG. 6 (c), if the aggregate value 646 of the inner nested set expression 642 644 is null, as in the case for Product 1 for year 2002, the value for Product 1 is not retrieved, thereby preventing "Ontario" 620 from being retrieved. The aggregate value 646 may further influence the inclusion of other data 648 650, through other relationships 652 654. In one embodiment of the present invention, the data 648 and 650 are also not retrieved if the aggregate value 646 is not retrieved. The relationships 652 654 are generally not aggregations.

In the example illustrated in FIG. 6 (a):, if sparsity removal is applied to both years 2002and 2003, only the row "Toronto" for Product 1 is removed. The filter for the corresponding set expression may be expressed as:

filter(children[Products], (tuple([2002], [Ontario],[Revenue]) is not null OR (tuple([2003], [Ontario],[Revenue]) is not null))

The resultant query results are shown in FIG. 6 (e).

Figure 7:
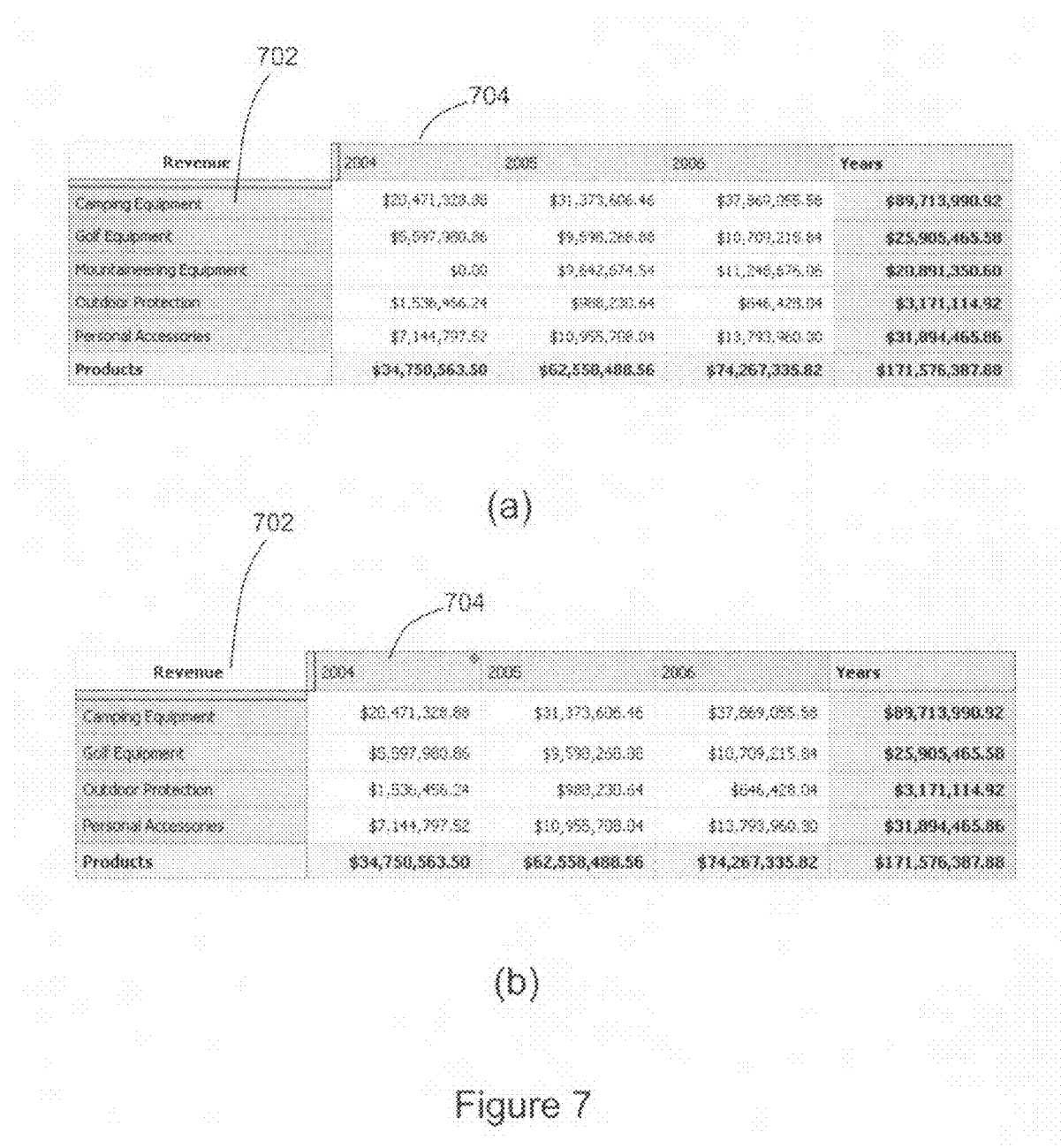
FIGS. 7 (a) and (b) illustrate an example where "2004" is selected for sparsity removal.
Figure 8:
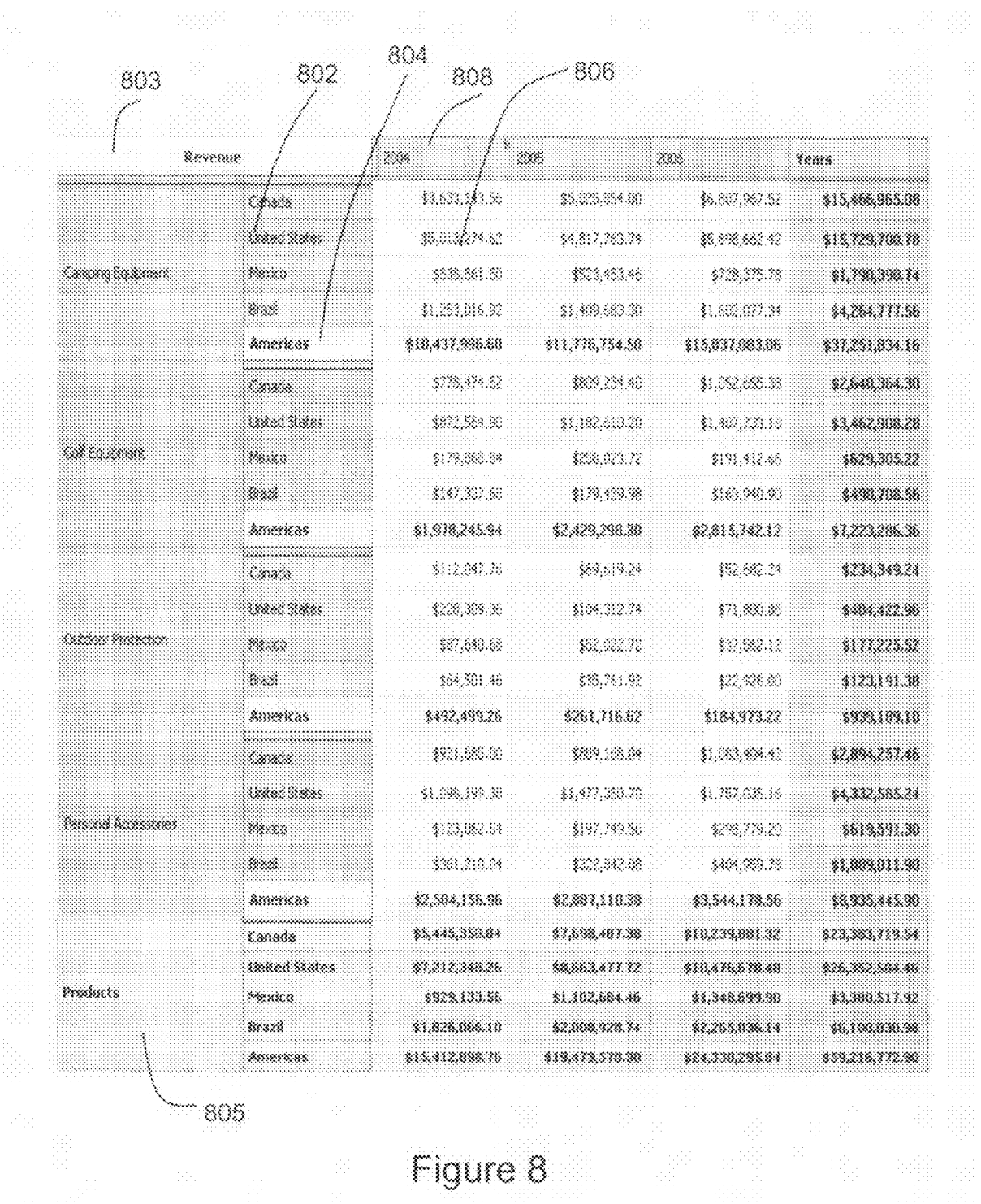

FIGS. 7-9 examples of sparsity removal.

FIG. 7 (a) shows an example where "2004" 704 is selected for sparsity removal. A filter for sparsity removal applied to null and zero value in the orthogonal axis Products 702 may be expressed as:

filter (children[Products],((tuple([2004], [Revenue])!=0) AND (tuple([2004], [Revenue]) is not null)))

The result of the sparsity removal is illustrated in FIG. 7 (b).

FIG. 8 shows an example where a crossjoined axis has an inner set expression that is comprised of the child members of country member "Americas" 802 and the aggregate member "Americas" 804 of the inner set expression, as well as an outer set expression for Products 803 and the aggregate member of the outer set expression "Products" 805.

A filter for sparsity removal applied to null data and zero value data in year "2004" 808 for the inner set expression "children of Americas" 802 may be expressed as:

filter(children[Americas],((tuple([2004], [Revenue])!=0) AND (tuple([2004], [Revenue]) is not null)))

Accordingly, a filter for sparsity removal applied to null data and zero value data in the outer level Product 803 and year "2004" 808 may be expressed as:

filter(children([Products], ((tuple([2004],[Americas], [Revenue])!=0) AND (tuple([2004],[Americas], [Revenue]) is not null)))

As indicated in the above examples, a tuple entry may be specified for each inner set expression. As also illustrated in FIG. 9 I, this means that members of the outer set expression 806 appear or disappear based on the intersection "Revenue" values of the inner set expression of "Americas" 804 intersected with "2004" 808. If there are further inner levels, each inner level would need to be represented in the outer level filter tuple.

As an alternative for the above method, to reflect context provided by an inner set expression, the filter of the outer set expression may use a conditional filter statement that tests the existence of the number of members returned for the inner level grouping below each member. If the inner set expression grouping has no results returned, then the outer set expression member in relation to the inner level grouping is not displayed.

Referring to FIG. 8, a filter for sparsity removal applied to null data and zero value data in the "Revenue" 806, the outer set expression Product 806, and year "2004" 808 may now be expressed as follows:

filter (children[Products], count (1 within set head ([filtered children of Americas], 1))>0)

FIG. 9 shows an example where a crossjoined axis has an inner set expression that is comprised of the top 2 child members of country member "Americas" 902 and an aggregate value "Subtotal (included)" 906 and an aggregate value "Subtotal (included)" 906 that is selected for sparsity removal that represents the visible members of the inner set expression, and an outer set expression Products 904. A filter for sparsity removal applied to null data and zero value data in "Revenue" 908, the aggregate value "Subtotal (included)" 906 and year "2004" 910 may be expressed as:

filter(children[Products],((tuple([2004],[Subtotal (Included)], [Revenue])!=0) AND (tuple([2004],[Subtotal (Included)], [Revenue]) is not null)))

Similar to the example in FIG. 8, a filter for sparsity removal applied to null data and zero value data in the "Revenue" 908, and year "2004" 910 for the inner set expression "top 2 children of Americas" 902 may be expressed as:

filter([top 2 children([Americas])],((tuple([2004], [Revenue])!=0) AND (tuple([2004], [Revenue]) is not null)))

The set expression for sparsity removal can also be set to automatically use the aggregation row or column of an axis instead of a specific user-selected row or column. This means that drilling up and down on the selected members' axis, i.e. within the dimension on the axis, will have sparsity removal enabled for the aggregation, regardless of the current summary member. The sparse data is reduced intelligently while still leaving key segments of the cross-tab intact so that the readability is not adversely affected. The summary on the axis to which the set expression of sparsity removal is applied is not affected by the rules, except when the axis is nested.

When an axis is nested, each subgroup of every outer set expression member has its own subgroup summary. If each subgroup summary is not affected by the filters of the set expression, then the resultant cross-tab may be significantly less useable due to the numbers of irrelevant subgroup summaries. To reduce the number of these summaries, a filter to every level of the selected cross-tab axis being affected by the sparsity removal may be applied.

Figure 10:
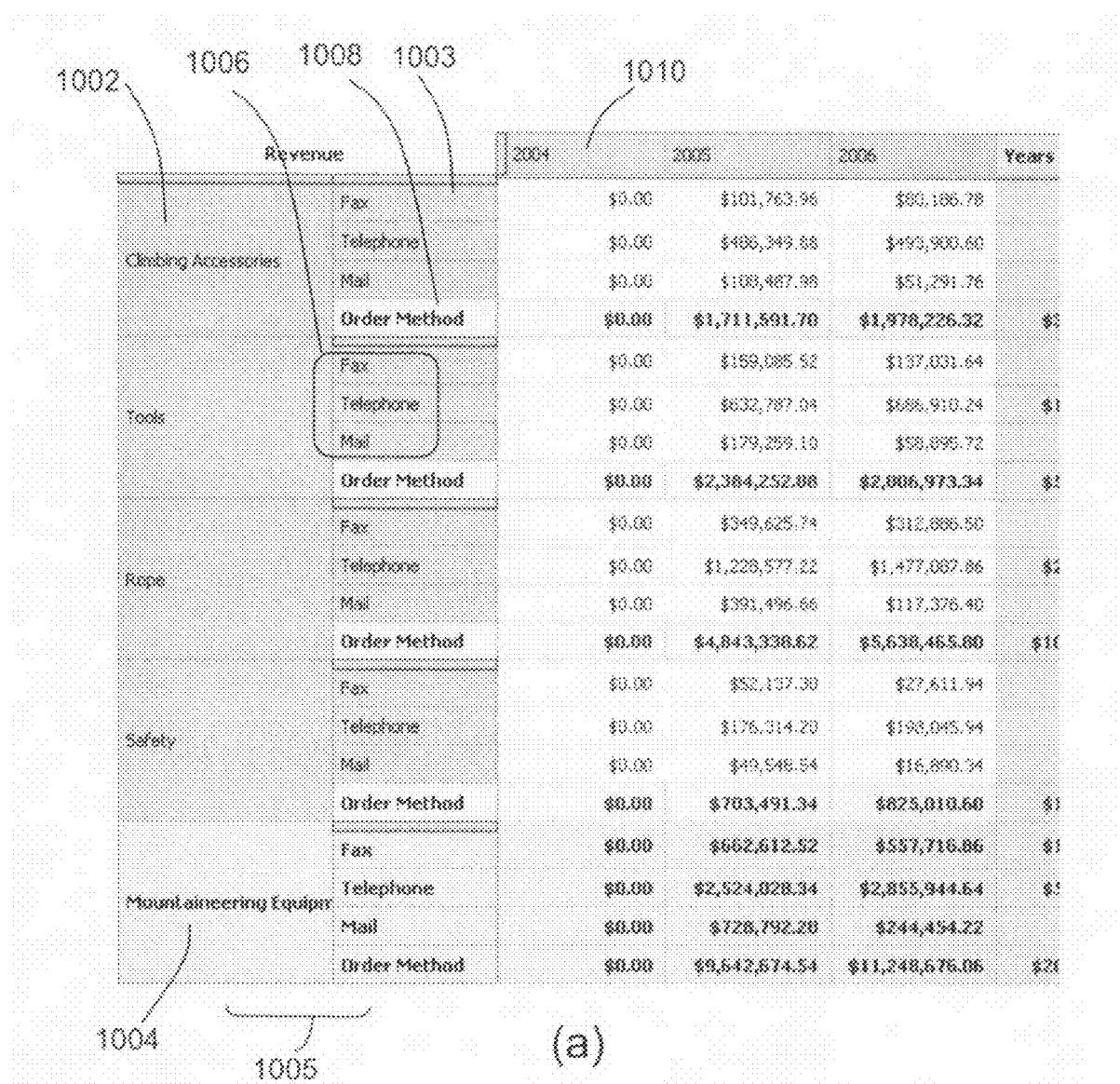
FIG. 10 (a) shows a cross-tab with a nested, cross-joined axis before sparsity removal.

Referring to FIG. 10 (a), a cross-joined axis with an outer set expression for "children of Mountaineering Equipment" 1002, an aggregate member for the outer set expression "Mountaineering Equipment" 1004, an inner set expression for "children of Order Method" 1006, and the aggregate member "Order Method" 1008 is shown. Applying a filter to every set expression causes each outer set expression to be evaluated independently of its inner set expression. If a member of an outer set expression is affected by the sparsity removal, then each subgroup of each inner set expression is affected by the sparsity removal as well. The summary of the outermost level, for example, the member "Mountaineering Equipment" 1004 in FIG. 10 (a) is not affected by the sparsity removal, as the sparse data removal filters are not applied to summary members. In general, sparsity removal does not apply to the summary members. The fact that the summary members of an inner set expression may disappear is a result of the filter that is applied to the outer set expressions. Therefore, the outermost set expression's summary member will not disappear, and, as such, the summary of the subgroup instance for the outermost summary member of any inner set expression will not disappear. This means that if all the data cells are deemed sparse, the user will always be left with at least one row that leaves an indication of what the axis is comprised of. For example, in FIG. 10 (a), the summary member "Mountaineering Equipment" 1004 in the outer set expression is not subjected to a sparse data removal filter. The inner set expression summary members are not subjected to the filtering either, but their display is suppressed through the filtering at the outer set expression. Because the summary member of the outermost level is unaffected, the inner level summaries will also remain unaffected due to (i) the relative outer member(s) not being subjected to filtering, and (ii) the inner level summary member(s) themselves not being subjected to filtering. This, in turn, allows an overall summary of each inner level to be retained. Even if all the members of an axis are affected by the sparsity removal, the user is still left with an artifact (a nesting of individual members, one for each nested level) that shows what expressions are actually being nested.

The filter expression for FIG. 10(a) is:
filter(children(MountaineeringEquipment),((tuple ([2004],[Order Method], [Revenue])!=0) AND (tuple ([2004],[ Order Method], [Revenue]) is not null)))

The result of the sparsity removal is shown in FIG. 10 (b).

Figure 11:
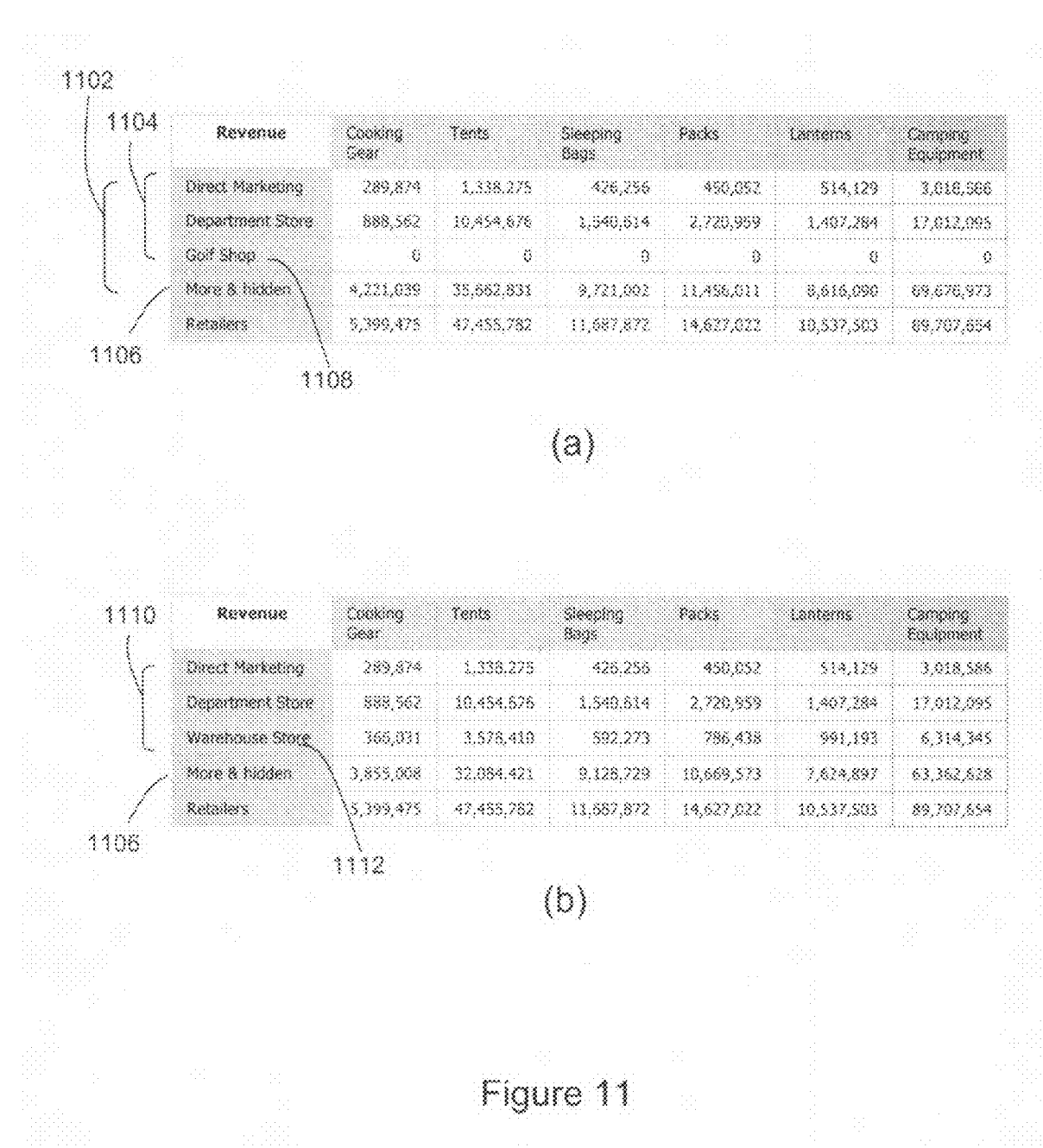
FIGS. 11 (a) and (b) show a cross-tab with a Visible segment and a Remainder segment, before and after sparsity removal, respectively.

In a business intelligence analysis system, members of a data set to be analysed may be segmented into different segments for displaying on a cross-tab. A segment is a subset of the members represented by the set expression used to define the axis. Referring to FIG. 11 (a), the segment containing members of interest are considered to be an Included segment 1102, which may be further separated into a Visible segment 1104 and a Remainder segment 1106. The Visible segment is the subset of the entire set of members that are being displayed on the edge of the cross-tab, and the Remainder segment is an aggregation of the all the non-visible members. The Remainder segment 1106 may include members of lesser interest, which may be encapsulated into a single member "More & hidden".

In the example shown in FIG. 11 (a), one member "Golf Shop" in the visible segment has a zero value. Also referring to FIG. 11 (b), if sparsity removal is applied to the rows, the size of the visible segment 1110 remains the same, thereby causing a new, non-zero member "Warehouse Stores" 1112 to replace the zero member to be visible.

Figure 12:
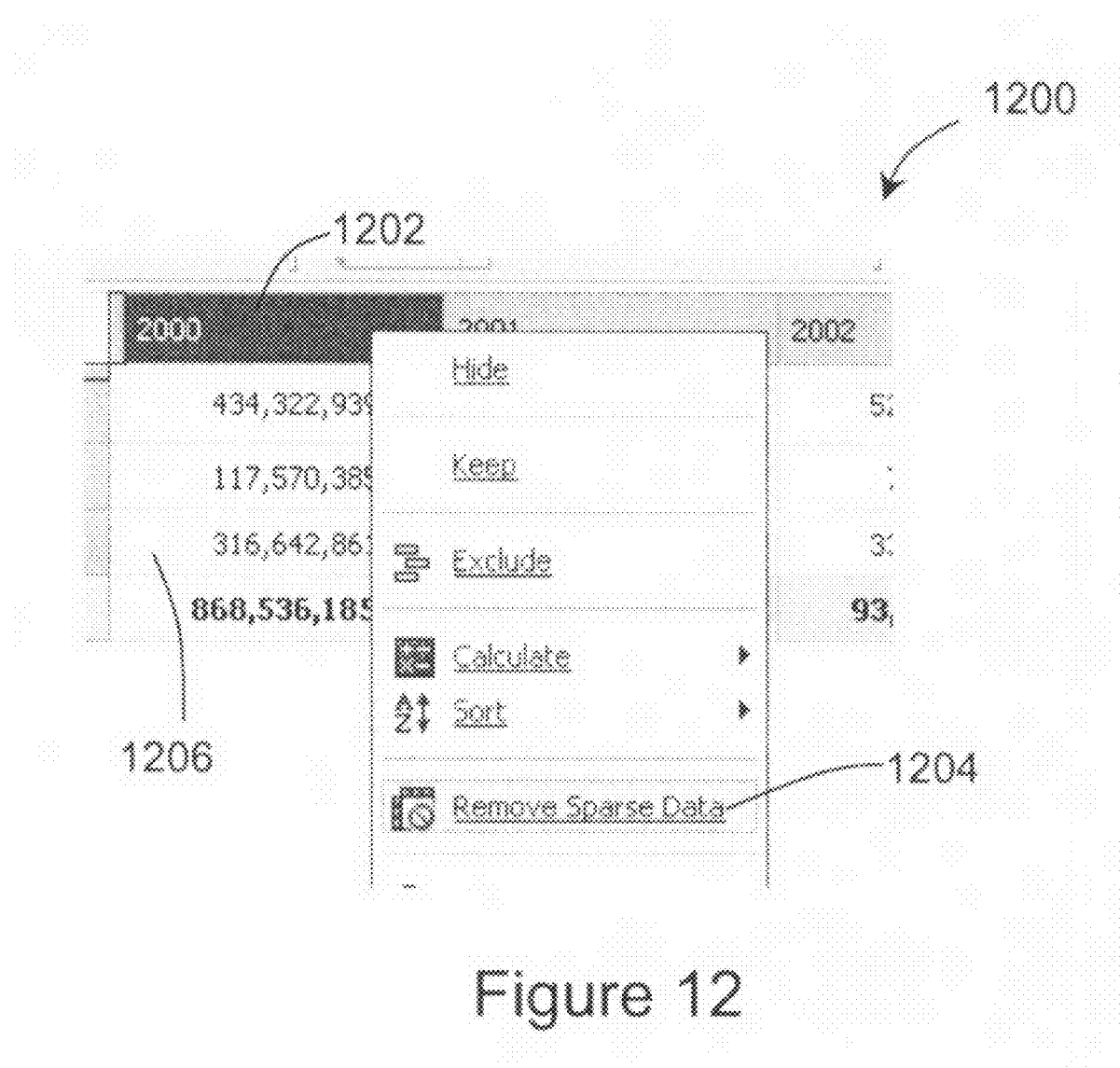
FIG. 12 shows a user interface (UI) for the sparsity removal.

FIG. 12 shows a user interface (UI) for the sparsity removal. In a multidimensional cross-tab 1200, the user has the option to select a specific member 1202 or set of members along an axis, and choose to suppress members along the orthogonal axis 1206. The criteria used to remove sparse data from members along the orthogonal axis may be defined as any orthogonal member whose data values for every selected member are null or zero.

Figure 13:
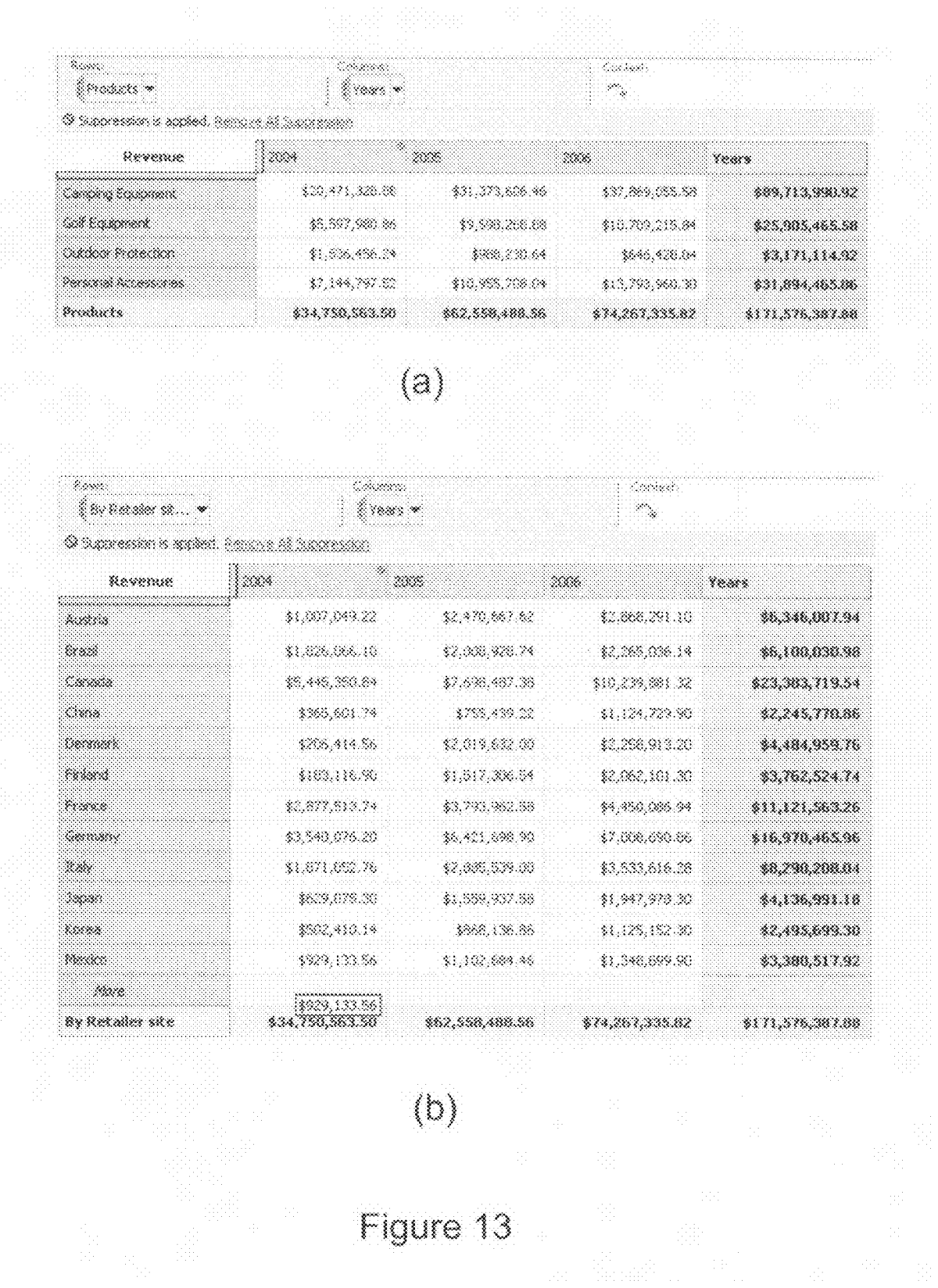

In accordance with one embodiment of the present invention the sparsity removal setting remains the same as long as the selected members are still in view of the UI. In the example shown in FIG. 13, this means that the row axis can change, and the new axis members will have a sparsity removal filter applied to them. Referring to FIG. 13 (a), a cross-tab with sparse data removed from rows based on the measure values for the year 2004. The set expression on the row axis in FIG. 13 (a) is "children of Products". The cross-tab in FIG. 13 (b) shows the same cross-tab with the row axis changed to the set expression "children of By Retailer Site". The original criteria were kept intact, and all rows with measure values of null or zero for column 2004 are removed for the new set expression.

After a column or row tuple is selected and the "remove sparse results" is applied, appropriate filter set expressions will be generated and applied to the orthogonal axis.

In accordance with one embodiment of the present invention, when a specific member is used as criteria for sparse data removal is selected, that sparse data setting will remain in effect unless the user modifies the set expression on the axis of the selected member in such a way that the selected member or members no longer appear. For instance, a user can place "children of Years" on the column axis, and select the year "2004" to be used for sparse data removal. The user then deletes the "children of Years" expression, and replaces it with "children of Europe". In this case, the user will no longer have the setting for sparse data removal for "2004", since the sparse data removal for column "2004" lost its meaning in that cross-tab. Exceptions to this behavior, and the sparsity removal maintenance may occur, if the user has enabled the sparsity removal on the summary member of a set expression and the user drills either up or down, in this case the sparsity removal setting will remain on the new summary for the set; or when the user has enabled sparsity removal on a non-summary member of the set and the user drills down on that member. In this case, the sparsity removal setting will remain on the same member, which becomes the summary after the drill action.

If the user changes the default measure definition and the tuple involves the default measure, the sparsity removal setting may be updated to use the new measure.

Generally, only tuples including explicit members can be selected for sparsity removal. This means that sparsity removal cannot be done based on the subtotal of included members, subtotal of excluded members, etc. The only exception to this is the summary calculation of a selection set or a level-members set.

Figure 14:
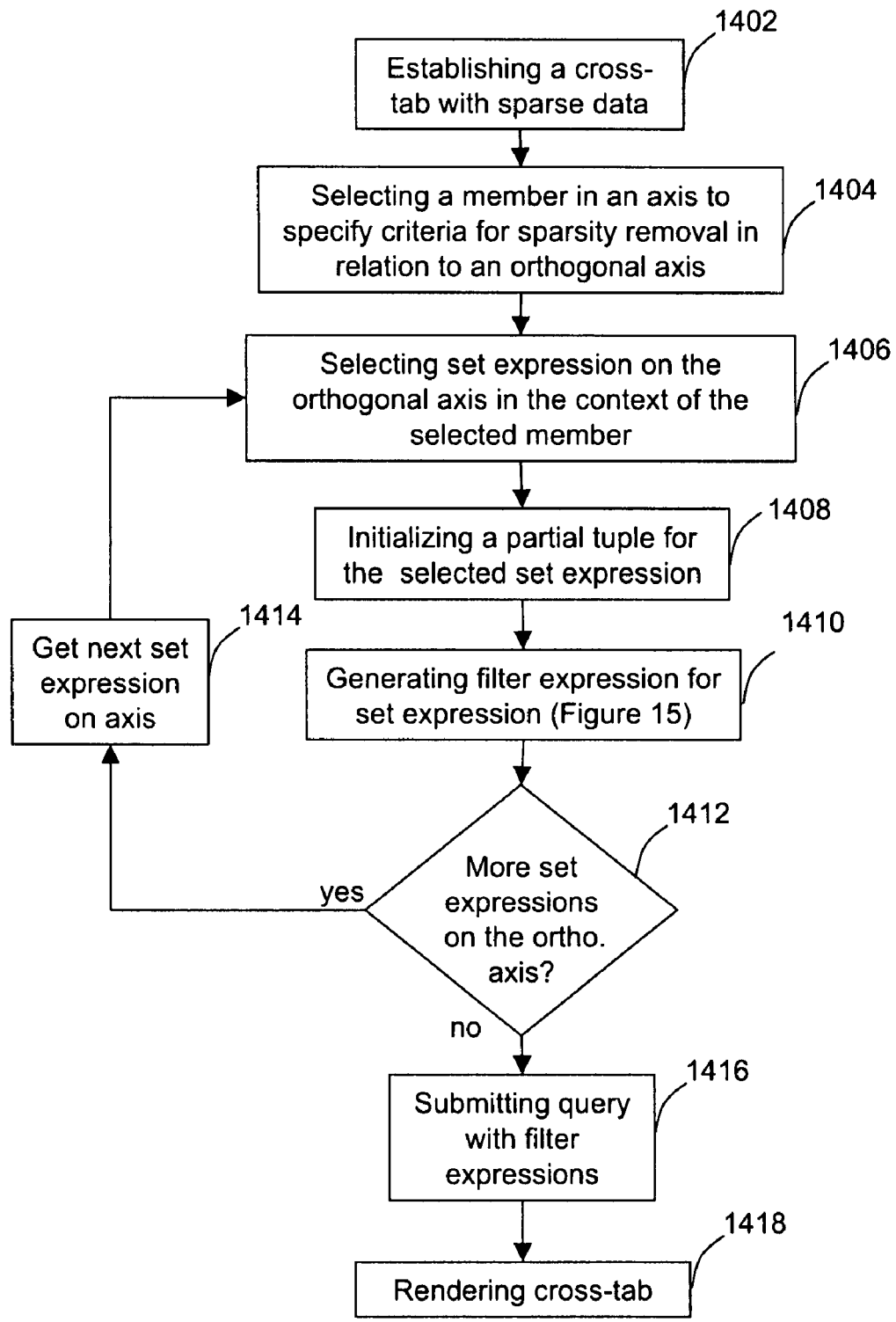
FIGS. 14 and 15 are flow charts for sparsity removal in accordance with one embodiment.

FIG. 14 illustrates the steps of a sparsity removal method in accordance with one embodiment of the present invention.

After a cross-tab with sparse data is established 1402, a member in an axis is selected to specify sparsity removal criteria, for example, not to return null, zero, or other irrelevant data, for sparsity removal in relation to an orthogonal axis 1404. The selection may be through a user gesture, for example by a user on a client UI. Also referring to FIG. 10, for example, the year 2004 1010, a member in the time dimension in the column axis, is selected for sparsity removal for the outer set expression 1005 in the row axis. This request may then be sent from the client to the server for further processing. The set expression on the orthogonal row axis 1002 in the context of the selected member is selected 1406. The user selects column "2004" 1010 and the orthogonal axis, namely the orthogonal row axis in this example, is further evaluated for additional context. In FIG. 10, the orthogonal row axis is a cross-join of the equipment 1002 as outer set expression and the order method 1003 as inner set expression.

The partial tuple for the set expression of the selected member is then initialized 1408. In the example of FIG. 10, "[2004] is added to the partial tuple result in "tuple [2004]". The outer set expression 1002 for the equipments in the cross-tab is examined. The filter for the set expression is then generated, for example at the server, based on the collected context 1410 which will be described in more details below. If there are other set expressions on the orthogonal axis 1412, the next set expression will be retrieved 1414 for evaluation.

After filters for all the set expressions are generated 1412, the query will be submitted with filtered set expressions 1416 that prevent sparse data from being returned, and the cross-tab is then rendered 1418.

Figure 15:
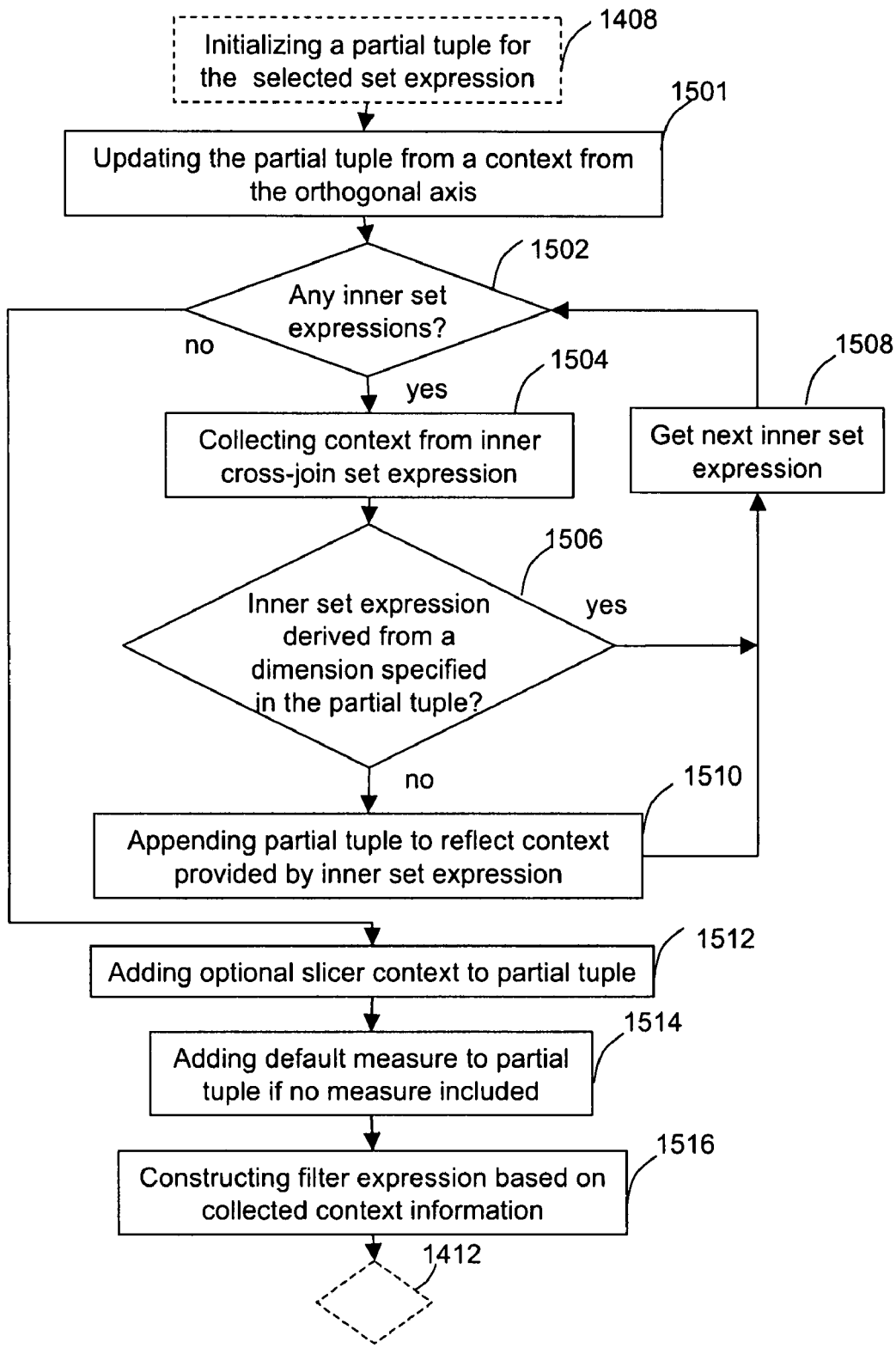

FIG. 15 describes the generation of a filter expression. A filter expression is a set expression that has filter criteria such that only members that pass the filter criteria are returned from the associated query. The context of the orthogonal axis is updated. If there is an inner set expression which provides extra context necessary for the filter expression 1502, the context from the inner set expression is collected 1504. The inner set expression is then examined to see whether it is derived from a dimension already specified in the partial tuple 1506. If the inner set expression is derived from a dimension already in the partial tuple, then the next possible inner set expression is collected 1508, because a dimension can only be represented once in the tuple. If the inner set expression is not derived from a dimension already represented in the partial tuple, the list of members in the tuple will be modified to include the context of the inner set expression 1510. In the example of FIG. 10 (a), [Order Method] is added to the partial tuple "tuple[2004]" and results in tuple[2004][Order Method]".

A slicer context may be added to the partial tuple 1512. A slicer in a multidimensional database resides usually outside a cross-tab, but provides additional context for the cross-tab. If no measure has been included, the context for measure is also added to the filter expression 1516. In FIG. 10, the measure Revenue is added to the tuple resulting in the tuple "tuple[2004][Order Method][Revenue]. The filter expression is the constructed based on the collected context information 1516.

FIG. 15 also indicates the precedence of the contextual dimensions being added to the partial tuple in accordance with one embodiment of the present invention: namely, context from user selected member; context from inner cross-joined set expressions; context from the slicer; and measure context. The order of precedence means that if a hierarchy or dimension is represented in the tuple of a filter expression, then it cannot be represented again. In the case where a dimension or hierarchy is represented more than once in the various context surrounding a set expression, then the order of precedence rules dictate which context has its information included in the tuple.

The business intelligence analysis client system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave and may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the business intelligence analysis client system are described separately, however, two or more elements may be provided as a single element, or one or more elements may be shared with other components in one or more computer systems.

What is claimed is:

1. A method implemented by at least one computer to remove sparse data in a response to a query to a multidimensional database, the method comprising:
   establishing, by at least one computer, a cross-tab with sparse data, the cross-tab comprising a first dimensional axis and a second dimensional axis, the second dimensional axis being orthogonal to the first dimensional axis;
   selecting, by the at least one computer, a member in the first dimensional axis for sparsity removal in the second dimensional axis;
   selecting, by the at least one computer, a first set expression on the second dimensional axis in a first context of the selected member;
   collecting, by the at least one computer, a second context of the second dimensional axis;
   generating, by the at least one computer, a filter set expression based on the collected second context, the filter set expression including data removal criteria to remove null or zero data; and
   submitting, by the at least one computer, a query with the filter set expression to the multidimensional database,
   wherein the second dimensional axis is a cross-join axis further comprising an inner set expression, and wherein the method further comprises:
   initializing, by the at least one computer, a tuple with the first set expression;
   collecting, by the at least one computer, a third context from the inner set expression;
   updating, by the at least one computer, the tuple to reflect the second context and the third context; and
   generating, by the at least one computer, the filter set expression based on the tuple.

2. The method of claim 1, wherein the second dimensional axis has a summary member and wherein the summary row is exempt from the data removal criteria.

3. The method of claim 1, further comprising adding a default measure to the tuple.

4. The method of claim 1, further comprising adding a slicer context to the tuple.

5. The method of claim 1, wherein the second dimensional axis further comprises an outer set expression to the inner set expression, further comprising removing all members of the inner set expression when the outer set expression is removed.

6. The method of claim 1, wherein selecting a member in the first dimensional axis is performed on a client.

7. The method of claim 1, wherein selecting a first set expression is performed by a server.

8. A business intelligence analysis system comprising a client computer and a server computer, the server computer responding to a query to a multidimensional database from the client computer, the system comprising:
   means for establishing a cross-tab with sparse data, the cross-tab comprising a first dimensional axis and a second dimensional axis, the second dimensional axis being orthogonal to the first dimensional axis;
   the client computer comprising:
   means for selecting a member in the first dimensional axis for sparsity removal in the second dimensional axis;
   the server computer comprising:
   means for selecting a first set expression on the second dimensional axis in a first context of the selected member;
   means for collecting a second context of the second dimensional axis;

means for generating a filter set expression based on the collected second context, the filter set expression including data removal criteria to remove null or zero data; and means for submitting a query with the filter set expression to the multidimensional database, wherein the second dimensional axis is a cross-join axis comprising an inner set expression, and wherein the server computer further comprises:

means for initializing a tuple with the first set expression;

means for collecting a third context from the inner set expression;

means for updating the tuple to reflect the second context and the third context; and means for generating the filter set expression based on the tuple.

9. A computer-readable memory encoded with instructions that, when executed, cause at least one computer to:

establish a cross-tab with sparse data, the cross-tab comprising a first dimensional axis and a second dimensional axis, the second dimensional axis being orthogonal to the first dimensional axis, and the second dimensional axis being a cross-join axis comprising an inner set expression;

select a member in the first dimensional axis for sparsity removal in the second dimensional axis;

select a first set expression on the second dimensional axis in a first context of the selected member;

collect a second context of the second dimensional axis;

generate a filter set expression based on the collected second context; the filter set expression including a data removal criteria to remove null or zero data; and submit a query with the filter set expression to a multidimensional database, initialize a tuple with the first set expression;

collect a third context from the inner set expression;

update the tuple to reflect the second context and the third context; and generate the filter set expression based on the tuple.

10. The storage medium of claim 9, wherein the computer program further comprises code means for adding a default measure to the tuple.

11. The storage medium of claim 9, wherein the computer program further comprises code means for adding a slicer context to the tuple.

* * * * *